(12) United States Patent
Rao et al.

(10) Patent No.: US 11,797,428 B2
(45) Date of Patent: Oct. 24, 2023

(54) DYNAMIC USER INTERFACE TESTING AND RECONCILIATION

(71) Applicant: Mitel Networks Corporation, Kanata (CA)

(72) Inventors: Preethi Rao, Udupi (IN); Logendra Naidoo, Ottawa (CN)

(73) Assignee: Mitel Networks Corporation, Kanata (CA)

(*) Notice: Subject to any disclaimer, the term of this patent is extended or adjusted under 35 U.S.C. 154(b) by 6 days.

(21) Appl. No.: 16/869,577

(22) Filed: May 7, 2020

(65) Prior Publication Data

US 2021/0349813 A1 Nov. 11, 2021

(51) Int. Cl.
*G06F 11/36* (2006.01)
*G06F 8/38* (2018.01)

(52) U.S. Cl.
CPC ............ *G06F 11/3688* (2013.01); *G06F 8/38* (2013.01); *G06F 11/3664* (2013.01)

(58) Field of Classification Search
CPC ............ G06F 11/3684; G06F 11/3664; G06F 11/3668; G06F 8/38
See application file for complete search history.

(56) References Cited

U.S. PATENT DOCUMENTS

| 10,509,718 | B2 | 12/2019 | Venkatasubramanian et al. |
| 10,733,754 | B2* | 8/2020 | Dayanandan ............ G06F 8/35 |
| 2012/0311471 | A1* | 12/2012 | Bullard ............... G06F 11/3688 715/765 |
| 2017/0277625 | A1* | 9/2017 | Shtuchkin ........... G06F 11/3688 |
| 2017/0337121 | A9 | 11/2017 | Singi et al. |
| 2018/0329690 | A1* | 11/2018 | Krishnan ................. G06F 8/35 |
| 2019/0250891 | A1* | 8/2019 | Kumar ................. G06N 3/0454 |
| 2020/0057622 | A1* | 2/2020 | Shtein ....................... G06F 8/41 |
| 2021/0064693 | A1* | 3/2021 | Sharma ................ G06F 16/958 |

* cited by examiner

*Primary Examiner* — Duy Khuong T Nguyen (57) ABSTRACT

Systems, devices, and methods for UI testing and reconciliation are presented. In one example, a method of UI testing includes generating a wireframe model of the UI. The method also includes generating a code segment from a portion of the wireframe model of the UI. Additionally, the example method includes determining whether an error in the code segment exists based on a comparison of an aspect of the wireframe model to an aspect of the code segment. The method may include generating an updated code segment from the portion of the wireframe model of the UI when determining the error in the code segment.

20 Claims, 7 Drawing Sheets

DYNAMIC USER INTERFACE TESTING AND RECONCILIATION

TECHNICAL FIELD

The present disclosure relates to user interfaces (UIs), and more particularly, to methods and devices for testing UIs.

BACKGROUND

Communication breakdown is a common problem when explaining to a developer what the user interface (UI)/user experience (UX) requirements are in a software application. For example, in order to identify application-interface-related issues, the UI/UX designer may take screenshots or use a third-party application to annotate the image to highlight an issue and report back to the software developer in a timely fashion. There is a similar issue faced when enhancing or adding additional features to an existing application. It may be a burden having to explain enhancements or additional features through cumbersome screenshots.

SUMMARY

In various embodiments, systems, devices, and methods for UI testing are presented. Testing the UI may include generating a code segment from a portion of a wireframe model of the UI and determining whether an error in the code segment exists based on a comparison of an aspect of the wireframe model to an aspect of the code segment.

In an embodiment, a method of UI testing includes generating a wireframe model of the UI. The method also includes generating a code segment from a portion of the wireframe model of the UI. Additionally, the method includes determining whether an error in the code segment exists based on a comparison of an aspect of the wireframe model to an aspect of the code segment.

In an embodiment, a UI testing device includes a processor and a memory. The memory includes instructions causing the processor to generate a wireframe model of a UI. The memory also includes instructions causing the processor to generate a code segment from a portion of the wireframe model of the UI. Additionally, the memory includes instructions causing the processor to determine whether an error in the code segment exists based on a comparison of an aspect of the wireframe model to an aspect of the code segment.

In an embodiment, a computer program product for UI testing, includes a computer-readable medium. The computer-readable medium includes code for causing at least one processor to generate a wireframe model of the UI. The computer-readable medium also includes code for causing at least one processor to generate a code segment from a portion of the wireframe model of the UI. Additionally, the computer-readable medium includes code for causing at least one processor to determine whether an error in the code segment exists based on a comparison of an aspect of the wireframe model to an aspect of the code segment.

The foregoing features and elements may be combined in any combination, without exclusivity, unless expressly indicated herein otherwise. The features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments makes reference to the accompanying drawings, which illustrate various embodiments by way of illustration. While the various embodiments are described in sufficient detail to enable those skilled in the art to practice the principles of the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. It should also be understood that unless specifically stated otherwise, references to "a," "an" or "the" may include one or more than one and that reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. Further, all ranges may include upper and lower values and all ranges and ratio limits disclosed herein may be combined.

In an embodiment, a cloud-based tool or other tool may be integrated into an application during development. Some examples may provide a bridge between UI/UX and developers. An example method disclosed herein may cut down on time spent on built-in annotations and dynamic re-arrangement using voice notes sent to an application business stakeholder. The proposed overlay method may speed up the development time and lower cost in some examples. An example embodiment may help UI/UX developers to add additional enhancements for the existing application with the base overlay. Another example embodiment may help to identify the UI/UX related issues and help in reporting them. Another example embodiment may help to add annotations and/or an outline, over the captured recorded flow. An example embodiment may help to record the flow and voice comment on the base overlay.

An example embodiment may offer a runtime user interface modifier module with functionality to re-arrange the elements on the client side based on UI/UX designers feedback and functionality to directly save the changed instances with annotations, voice notes and actions on the cloud for immediate diagnosis by the development team. In one aspect, a dynamic user interface editor for UI/UX professionals with built-in code to rearrange the elements in the screen with voice notes and annotations is disclosed. In one aspect, a recorder for runtime changes in UI elements with comments for every requested change is disclosed. In another aspect, the systems and methods described herein may be run in a base overlay.

An example embodiment may be used in software development lifecycles in product iterations and planning for future updates with annotations and comments in the screen. An example embodiment may also be used to check constraints in layouts while rearranging the elements as to check its feasibility for development. An example embodiment may be used to AB test multiple versions of the screen design without having to go through a developer or designer to change the layout. An aspect may be a tool (library) which may be integrated with the application and enabled or disabled programmatically.

An example embodiment, includes a dynamic UI/UX Editor for UI/UX professionals. The example embodiment may provide a methodology where the product is developed with modular code such that the layout of the product allows it to be easily modified in the front end without much effort from the UI/UX personnel. Furthermore, in a distributed cloud-based development environment, prior to product launch/deployment, it is possible to operate as a separate service. A problem may initially arise when UX designers have issues with development prototypes where they have to capture screenshots and later have the tedious task of documenting and annotating the screenshots with the required changes to be made. This gap means the developer may ended up with more queries and misunderstandings as the development cycle may be long.

When a prototype is received from the developers, the UI/UX designers had to manually mark the issues related to certain placements and user interface issues. These required for them to take screenshots and annotate and attach it to a bug tracking tool or anything similar. But, the developer who would work on these bug or issues might end up misunderstanding the feedback or may have more questions due to the nature of the supported references of text or screenshots. Hence, an example module may allow the UI/UX designers to directly record the changes in movements or actions along with text/audio annotations and send them to the cloud with a rearranged UI design stored in the cloud and accessible by the whole team.

The use of such a module in development of a product may help the UI/UX designer to make changes in the prototype including rearranging UI elements using dynamic video recording or base overlay annotations, which may make the developers and product managers easier to understand and make rectifying any issues easier. Hence, such systems and methods may save time and money. The code may need to be more modular. Modular code may make the UI easy to be molded into multiple variations and positions. In an example, the video recording and text annotations library may be an additional code added into the existing codebase.

Features of the methodology may include dynamic UI re-arrangement, video recording in the base application, dynamic movement recording of the elements, text comments for a particular interval for that change, annotations in base applications to explain in screen, and components of the methodology (listed). In an example, the methodology may save time and money. Developers may understand the changes more easily with direct runtime annotations. Multiple prototypes may be achieved in a very short amount of time for the AB test. UI/UX designers may save time in clearly describing the changes with video recordings, annotations, text comments and runtime movement recording.

Figure 1:
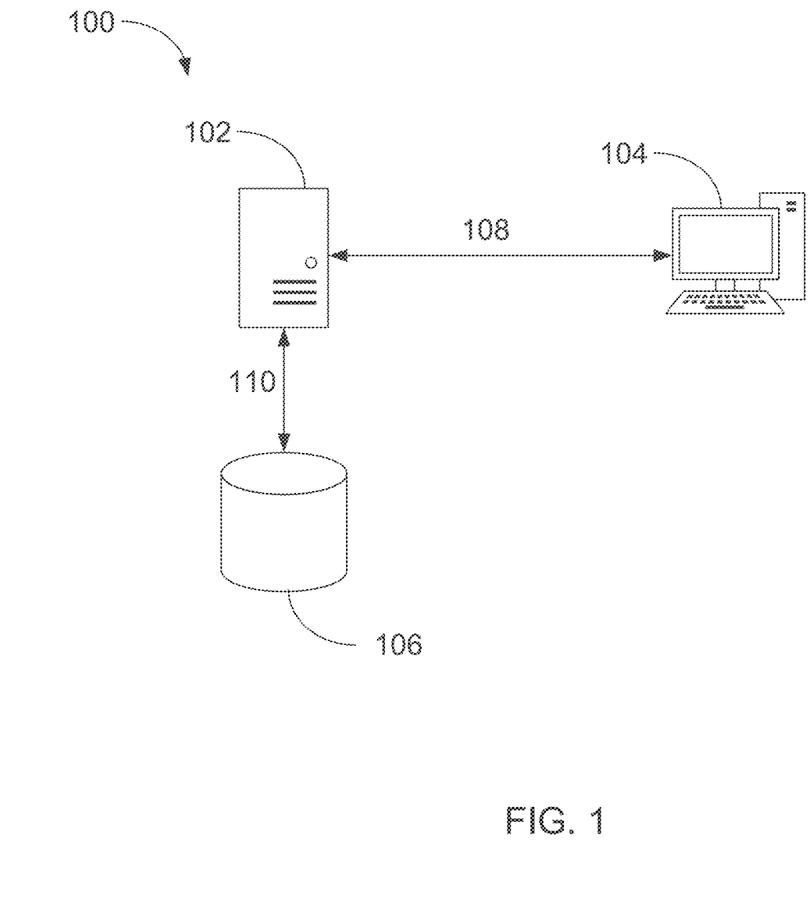
FIG. 1 is a diagram that illustrates a server system implementing the systems and methods described herein.

FIG. 1 is a diagram that illustrates a server system 100 implementing the systems and methods described herein. The server system includes a server 102, a computing device 104, and a database 106. The server 102, the computing device 104, and the database 106 may be connected over network connections 108, 110. In an example embodiment, the server 102 may be a UI testing device. For example, the server 102 may include a processor and a memory. The memory may include instructions causing the processor to generate a wireframe model of a UI, generate a code segment from a portion of the wireframe model of the UI, and determine whether an error in the code segment exists based on a comparison of an aspect of the wireframe model to an aspect of the code segment. In one example, a user may draw a representation of the UI using the computing device 104. The representation of the UI may be processed by the processor in the server 102 to generate a wireframe model of a UI. The processor in the server 102 may further generate a code segment from a portion of the wireframe model of the UI and determine whether an error in the code segment exists based on a comparison of an aspect of the wireframe model to an aspect of the code segment. In some examples, the comparison of the aspect of the wireframe model to the aspect of the code segment includes comparing a resulting UI to a wireframe model. In other examples, the comparison of the aspect of the wireframe model to the aspect of the code segment includes comparing the sample code portion to the code segment.

In another example, processing may be spread between the server 102 and the computing device 104. For example, the computing device 104 may generate a wireframe model of a UI. The server 102 may receive the wireframe model of the UI from the computing device 104. The server 102 may generate a code segment from a portion of the wireframe model of the UI and determine whether an error in the code segment exists based on a comparison of an aspect of the wireframe model to an aspect of the code segment.

In general, one or more of the server 102 and the computing device 104 may perform one or more of generating a wireframe model of a UI, generating a code segment from a portion of the wireframe model of the UI, and determining whether an error in the code segment exists based on a comparison of an aspect of the wireframe model to an aspect of the code segment. In other words, the functions described with respect to the systems and methods described herein may occur in the server 102, the computing device 104, or both the server 102 and the computing device 104. Some functions may occur in the server 102 and other functions may occur in the computing device.

In an example, one or more of the server 102 and the computing device 104 may generate a resulting UI from the code segment. For example, a memory in one or more of the server 102 or the computing device 104 may further include instructions causing a processor in one or more of the server 102 or the computing device 104 to generate a resulting UI from the code segment. In such an example, the comparison of the aspect of the wireframe model to the aspect of the code segment may include comparing the resulting UI to the wireframe model to determine the error in the code segment.

In an example, one or more of the server 102 or the computing device 104 may select a sample code portion from a set of predetermined test cases based on the wireframe model. For example, a memory in one or more of the server 102 or the computing device 104 may further include instructions causing a processor in one or more of the server 102 and the computing device 104 to select a sample code portion from a set of predetermined test cases based on the wireframe model. In such an example, the comparison of the aspect of the wireframe model to the aspect of the code segment may include comparing the sample code portion to the code segment to determine the error in the code segment.

In an example, one or more of the server 102 or the computing device 104 may generate an updated code segment from the portion of the wireframe model of the UI when determining the error in the code segment. For example, a memory in one or more of the server 102 or the computing device 104 may further include instructions causing a processor in one or more of the server 102 or the computing device 104 to generate an updated code segment from the portion of the wireframe model of the UI when determining the error in the code segment.

In an example, one or more of the server 102 or the computing device 104 may determine whether a second error in the code segment exists based on a second comparison of the aspect of the wireframe model to the aspect of the updated code segment. For example, a memory in one or more of the server 102 or the computing device 104 may further include instructions causing a processor in one or more of the server 102 or the computing device 104 to determine whether a second error in the code segment exists based on a second comparison of the aspect of the wireframe model to the aspect of the updated code segment.

In an example, one or more of the server 102 or the computing device 104 may add the code segment to a set of predetermined test cases to generate a new set of predetermined test cases. For example, a memory in one or more of the server 102 or the computing device 104 may further include instructions causing a processor in one or more of the server 102 or the computing device 104 to add the code segment to a set of predetermined test cases to generate a new set of predetermined test cases. For example, the code segment may be saved to a set of predetermined test cases in the database 106.

In an example, one or more of the server 102 or the computing device 104 may save the set of predetermined test cases to a cloud-based library. For example, a memory in one or more of the server 102 or the computing device 104 may further include instructions causing a processor in one or more of the server 102 or the computing device 104 to save the set of predetermined test cases to a cloud-based library. For example, in an embodiment, the database 106 may be saved to a cloud-based library.

In an example, one or more of the server 102 or the computing device 104 may analyze source code to verify an existence of a UI element. For example, a memory in one or more of the server 102 or the computing device 104 may further include instructions causing a processor in one or more of the server 102 and the computing device 104 to analyze source code to verify an existence of a UI element.

Figure 2:
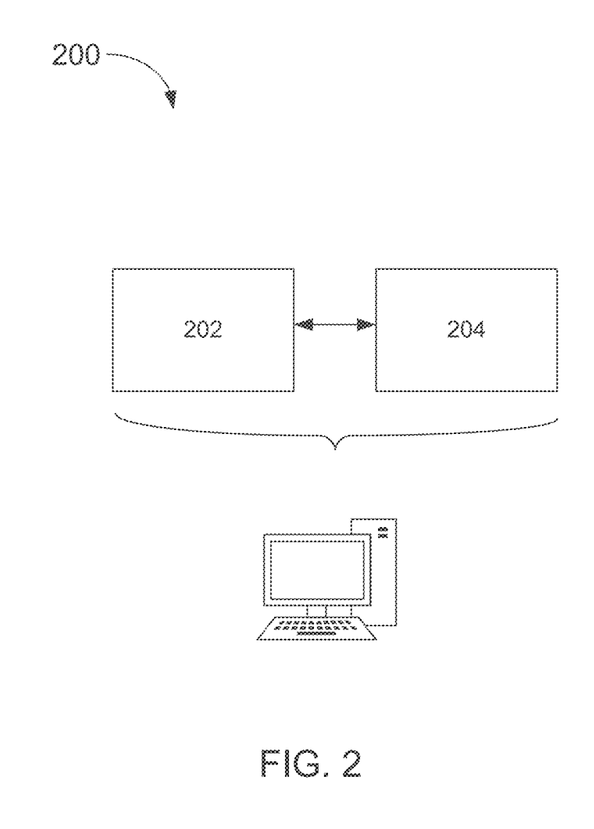
FIG. 2 is a diagram illustrating a device implementing the systems and methods described herein.

FIG. 2 is a diagram illustrating a computing device 200 implementing the systems and methods described herein. In the example of FIG. 2, various aspects that may be implemented in the server 102 of FIG. 1, the computing device 104 of FIG. 1, or both the server 102 and the computing device 104 may, alternatively, be implemented in the computing device 200. For example in an embodiment, the computing device 200 may be a UI testing device. The computing device 200 may include a processor 202 and a memory 204. The memory 204 may include instructions causing the processor 202 to generate a wireframe model of a UI, generate a code segment from a portion of the wireframe model of the UI, and determine whether an error in the code segment exists based on a comparison of an aspect of the wireframe model to an aspect of the code segment. In one example, a user may draw a representation of the UI using the computing device 200. The representation of the UI may be processed by the processor 202 to generate a wireframe model of a UI. The processor 202 may further generate a code segment from a portion of the wireframe model of the UI and determine whether an error in the code segment exists based on a comparison of an aspect of the wireframe model to an aspect of the code segment.

In an example, the computing device 200 may generate a resulting UI from the code segment. For example, the memory 204 may further include instructions causing the processor 202 to generate a resulting UI from the code segment. The comparison of the aspect of the wireframe model to the aspect of the code segment may include comparing the resulting UI to the wireframe model to determine the error in the code segment.

In an example, the computing device 200 may select a sample code portion from a set of predetermined test cases based on the wireframe model. For example, the memory 204 may further include instructions causing the processor 202 to select a sample code portion from a set of predetermined test cases based on the wireframe model. The comparison of the aspect of the wireframe model to the aspect of the code segment may include comparing the sample code portion to the code segment to determine the error in the code segment.

In an example, the computing device 200 may generate an updated code segment from the portion of the wireframe model of the UI when determining the error in the code segment. For example, the memory 204 may further include instructions causing the processor to generate an updated code segment from the portion of the wireframe model of the UI when determining the error in the code segment.

In an example, the computing device 200 may determine whether a second error in the code segment exists based on a second comparison of the aspect of the wireframe model to the aspect of the updated code segment. For example, the memory 204 may further include instructions causing the processor 202 to determine whether a second error in the code segment exists based on a second comparison of the aspect of the wireframe model to the aspect of the updated code segment.

In an example, the computing device 200 may add the code segment to a set of predetermined test cases to generate a new set of predetermined test cases. For example, the memory 204 may further include instructions causing the processor 202 to add the code segment to a set of predetermined test cases to generate a new set of predetermined test cases.

In an example, the computing device 200 may save the set of predetermined test cases to a cloud based library. For example, the memory 204 may further include instructions causing the processor 202 to save the set of predetermined test cases to a cloud based library.

In an example, the computing device 200 may analyze source code to verify an existence of a UI element. For example, the memory 204 may further include instructions causing the processor 202 to analyze source code to verify an existence of a UI element.

One or more of the devices of FIGS. 1 and 2 may perform one or more of the functions described above. For example, one or more of the server 102, the computing device 104, or the computing device 200, or more specifically, a processor or other circuitry in the server 102, the computing device 104, or the computing device 200 may perform one or more of the functions described above. The processor or other circuitry may include one or more processors, one or more microprocessors, one or more microcontrollers, programmable logic, logic devices, analog circuitry, or other circuitry capable of performing the functions described above.

For example, one or more of the devices of FIGS. 1 and 2 may analyze source code to verify an existence of a UI element. In some examples, code may be written in C/C++, Java, Python, VB.net/C#, HTML, or other code language. The code may be compared to a database of samples of UI/UX source code. Code that is similar to code in the database of samples of UI/UX source code may be determined to be a UI (or UX) element.

One or more of the devices of FIGS. 1 and 2 may generate a wireframe model of the UI. For example, a user may generate a representation of a UI (or UX). From the representation of the UI, a wireframe model of the UI. For example, the wireframe model of the UI may be a simplified model of the generated representation of the UI. The simplified model of the generated representation of the UI may be an outline of each item in the UI. For example, the wireframe model may be outlines of radio buttons, locations of drop down lists, forms, logos, banners, or other items in the UI.

One or more of the devices of FIGS. 1 and 2 may generate a code segment from a portion of the wireframe model of the UI. As discussed above, the wireframe model may be outlines of radio buttons, locations of drop down lists, forms, logos, banners, or other items in the UI. The radio buttons, drop down lists, forms, logos, banners, or other items in the UI may be generated using computer code. For example, as discussed above, the code used to generate the UI may be written in C/C++, Java, Python, VB.net/C#, HTML, or other code language. Code may be made based on the radio buttons, drop down lists, forms, logos, banners, or other items in the UI.

One or more of the devices of FIGS. 1 and 2 may generate a resulting UI from the code segment. For example, the code segments generated may be used to generate parts of the UI, such as the radio buttons, drop down lists, forms, logos, banners, or other items. The radio buttons, drop down lists, forms, logos, banners, or other items may be located within the UI (or UX) based on the wireframe model to generate a resulting UI from the code segment.

One or more of the devices of FIGS. 1 and 2 may select a sample code portion from a set of predetermined test cases based on the wireframe model. For example, as discussed above, the wireframe model may be outlines of radio buttons, locations of drop down lists, forms, logos, banners, or other items in the UI. The radio buttons, drop down lists, forms, logos, banners, or other items in the UI may be generated using computer code. For example, as discussed above, the code used to generate the UI may be written in C/C++, Java, Python, VB.net/C#, HTML, or other code language. Code may be selected from a database of example code portions based on similarity of the code to the radio buttons, drop down lists, forms, logos, banners, or other items in the UI.

One or more of the devices of FIGS. 1 and 2 may determine whether an error in the code segment exists based on a comparison of an aspect of the wireframe model to an aspect of the code segment. For example, sample code may be compared to generated code or a representation of a UI may be compared to a UI generated from code. The comparison may be repeated, e.g., after a correction is made to determine whether a second error in the code segment exists based on a second comparison of the aspect of the wireframe model to the aspect of the updated code segment.

One or more of the devices of FIGS. 1 and 2 may generate an updated code segment from the portion of the wireframe model of the UI when determining the error in the code segment. For example, when an error is determined, the code may be re-generated in an attempt to eliminate the error. The code may be modified to change the size or shape of radio buttons, drop down lists, forms, logos, banners, or other items in the UI. Code may also be modified to change the location of the radio buttons, drop down lists, forms, logos, banners, or other items in the UI.

One or more of the devices of FIGS. 1 and 2 may add the code segment to a set of predetermined test cases to generate a new set of predetermined test cases. For example, the predetermined test cases may be determined and expanded over time by adding new code segments as the new code segments are developed. In some examples, a number of predetermined test cases may be developed initially and new test cases may be added, e.g., over a period of time.

One or more of the devices of FIGS. 1 and 2 may save the set of predetermined test cases to a cloud based library. For example, the set of predetermined test cases may be saved to a database on the internet, e.g., a cloud based library. In other examples, the set of predetermined test cases may be saved locally on a computing device hard drive, on a network server, or on another data storage device or devices.

As described herein, UI testing may perform various comparisons to find errors in a UI. For example, in some aspects, generated UI code may be compared to reference UI code to determine if the generation of the UI code, e.g., from a wireframe model, was performed correctly and generated a correct result. In other examples, the wireframe may be compared to the resulting UI. In some examples, both generated UI code may be compared to reference UI code and the wireframe may be compared to the resulting UI to determine if the generation of the UI code is correct.

In examples where generated UI code is compared to reference UI code to determine if the generation of the UI code is correct, a database of reference UI code may be searched for similar UI code to the generated UI code. The similar UI code and the generated UI code may be compared to determine if the generation of the UI code is correct. For example, in one aspect, code may be generated using Python Graphical User Interface (GUI) and the Tkinter coding package. In the Tkinter coding package, for example, a simple window may have the following sample code:

```
from tkinter import *
window = Tk( )
window.title("Example Window")
window.mainloop( )
```

Example 1

The last line of the sample code above (EXAMPLE 1) calls the mainloop function. The mainloop function calls an endless loop of the window. Accordingly, the window generated will wait for user input, e.g., user input closing the window. Assume that the following code is generated from the wireframe for a simple window:

```
from tkinter import *
window = Tk( )
window.title("Example Window")
```

Example 2

In the example code above (EXAMPLE 2), the mainloop function is missing. Accordingly, the window will not appear to the user, e.g., on a monitor when the example code is executed on an electronic device having a GUI. The code of EXAMPLE 2 includes an error. By comparing EXAMPLE 1 and EXAMPLE 2 the systems and methods described herein may determine that the mainloop function is missing. For example, the code of EXAMPLE 2 may be compared to code in a database to determine that it is similar to the code of EXAMPLE 1 and that the mainloop code is missing.

In another example, a button may be added to the window:

```
from tkinter import *
window = Tk( )
window.title("Example with button")
window.geometry('350×200')
lbl.grid(column=0, row=0)
btn = Button(window, text="Click Here")
btn.grid(column=1, row=0)
window.mainloop( )
```

Example 3

The following code may be generated:

```
from tkinter import *
window = Tk( )
window.title("Example with button")
window.geometry('350×220')
lbl.grid(column=0, row=0)
btn = Button(window, text="Click Here")
btn.grid(column=1, row=0)
window.mainloop( )
```

Example 4

In EXAMPLE 4, the size of the window may be incorrect or the size of the window may simply be different. Example 3 is an example of a window with a button. The size of the window may be different from the example in the sample cases. EXAMPLE 4 may be compared to samples in a database to find a similar example, e.g., EXAMPLE 3. EXAMPLE 3 and EXAMPLE 4 may be compared to each other to determine that the EXAMPLE 4 appears to be correct and may function correctly. The size (window.geometry('350×220') may be flagged for further analysis. For example, the database may include information that indicates that the size (window.geometry('350×220') may vary. In other words, different windows may be different sizes. In some examples, this may be assumed to be correct based on the comparison between EXAMPLE 3 and EXAMPLE 4 and the determination that the size (window.geometry('350× 220') may vary. In other examples, the window size of EXAMPLE 4 (350×220) may be compared to a window size in the wireframe. Accordingly, the size of the window may be checked to determine when the size of the window is correct and when the size of the window is incorrect.

As described herein, color may be checked in the UI. For example, color for a button may be known, e.g., yellow background and black letters. Accordingly, the following code may be generated:
  btn=Button(window, text="Click Here", bg="yellow", fg="black")

Example 5

EXAMPLE 5 may be compared to a database of samples to determine that EXAMPLE 5 is similar to the following example:
  btn=Button(window, text="Click Me", bg="color 1", fg="color 2")

Example 6

EXAMPLE 5 and EXAMPLE 6 may be compared. In EXAMPLE 6 variables, color 1 and color 2 may be used to indicate that different colors may be present. Accordingly, the colors used in EXAMPLE 5 may be compared to colors that are expected to be used to determine if the correct code has been generated. It will be understood that variables may be used in EXAMPLE 3 as well, rather than the numerical example provided above.

It will be understood that different code segments may be generated and that the code segments may still be determined to be correct, e.g., when a system generates a UI that performs according to the specification for the particular UI (or UX). Furthermore, it will be understood that other programming languages or UI packages or GUI tools may be used in conjunction with the systems and methods described herein. The above examples in tkinter are only intended to provide examples of one possible GUI tool that may be used. As discussed herein, the code used to generate the UI may be written in C/C++, Java, Python, VB.net/C#, HTML, or other code languages or GUI tools.

In examples where the wireframe is compared to the resulting UI, the wireframe may be checked to determine the size, shape, location, and function of various UI elements. For example, the location of a radio button, drop down menu, or other UI function may be checked by comparing the wireframe and the resulting UI. A wireframe may also include the size and shape of the radio button, drop down menu, or other UI function. The size and shape of the radio button, drop down menu, or other UI function in the wireframe may be compared to the size and shape of the radio button, drop down menu, or other UI function on the resulting UI. In short, two graphical items, the wireframe and the resulting UI, may be compared to each other to determine when the resulting UI has been generated correctly.

Figure 3A:
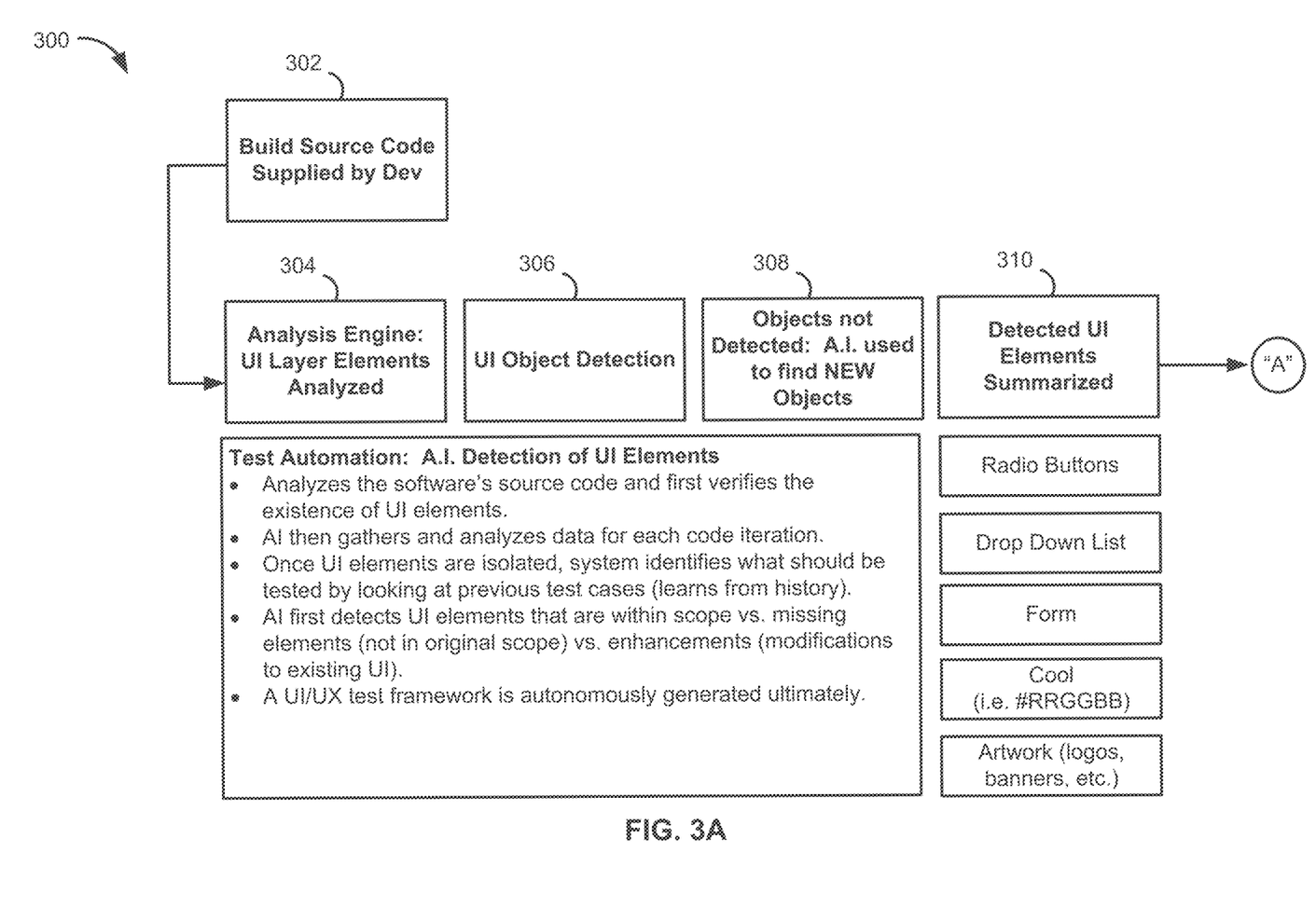
FIGS. 3A-3C are diagrams illustrating processes that may be used in a UI testing and reconciliation system.
Figure 3B:
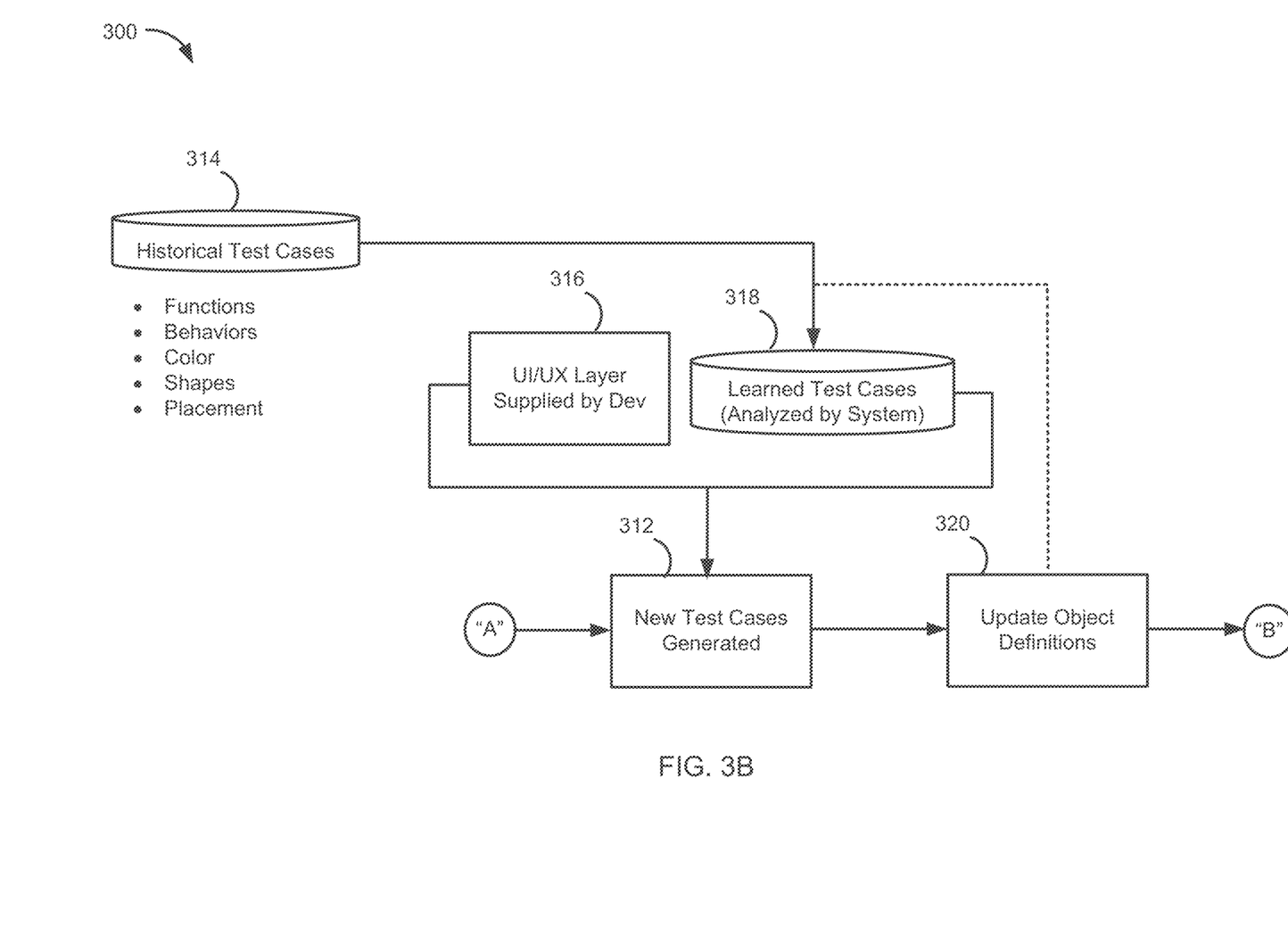
Figure 3C:
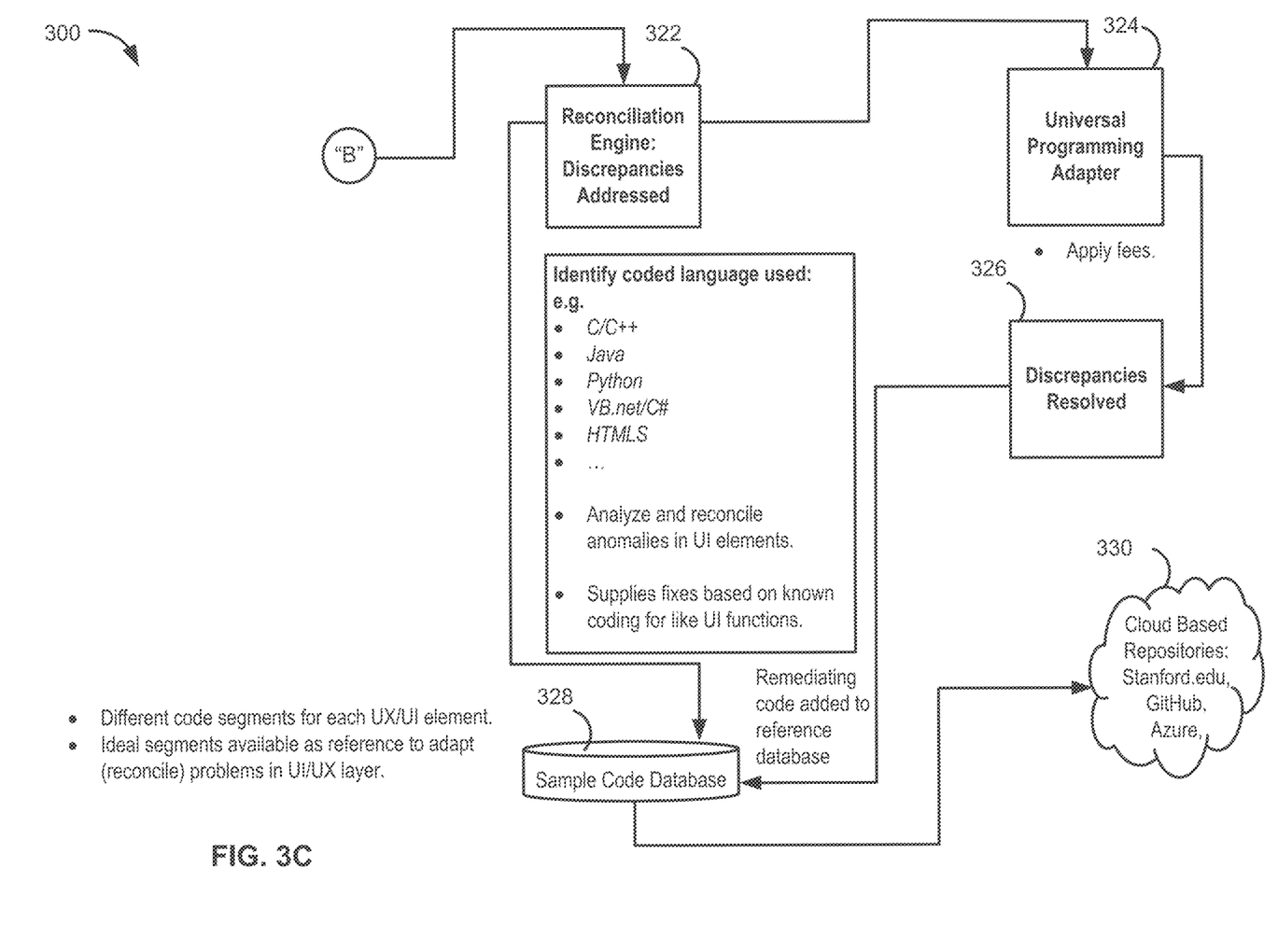

FIGS. 3A-3C are diagrams illustrating processes that may be used in a UI testing and reconciliation system 300. In FIG. 3A, the example process that may be used in a UI testing and reconciliation system 300 may include building source code supplied by a developer 302. For example, a developer may generate source code for a UI. The source code for the UI may be developed as separate code segments that may be combined to generate a complete UI.

The systems and methods described herein may analyze the software's source code and verify the existence of UI elements. An artificial intelligence (AI) may gather and analyze data for each code iteration. Once UI elements are isolated, the system may identify what should be tested by analyzing previous test cases. The AI first detects UI elements that are within scope versus any missing elements and enhancements. A UI/UX test framework may be autonomously generated.

The example process that may be used in a UI testing and reconciliation system 300 may also include an analysis engine 304 for analyzing UI layered elements. The analysis engine 304 may analyze how different elements of the UI interact with one another. For example, how a drop down menu interacts with other elements of the UI when the drop down menu is opened. Additionally, the example process that may be used in a UI testing and reconciliation system 300 may include a UI object detection block 306. The UI object detection block may be used to detect UI objects in the source code. For example, the UI object detection block 306 may analyze source code to verify the existence of UI elements in the source code.

The UI object detection block may be augmented by AI to help find new UI objects at AI block 308. For example, a new piece of UI code may be different from any UI sample code that the new UI code is being compared with. Accordingly, AI may be needed to find the new object. Any UI objects found using UI object detection block 306 or AI block 308 may be summarized at detected UI element summarized block 310. The UI code may include radio buttons, drop down lists, forms, color elements, artwork, or other AI elements.

In FIG. 3B, new test cases may be generated at new test case generated block 312. The new test cases may be based on the UI element summary from the detected UI element summarized block 310 and additional information from the UI/UX layer supplied by developer block 316 and the learned test cases block 318. The learned test cases block 318 may include data from historical test cases 314 including functions, behaviors, colors, shapes, placements, and other historical test cases. Object definitions may be updated with the new test cases generated at the update object definition block 320.

In some cases, errors may be found in the UI. For example, locations of UI elements may be off, UI elements may be missing, UI elements may function incorrectly, UI element shapes may be incorrect, color may be incorrect, placement may be incorrect, or other errors in the UI may be found. Accordingly, in FIG. 3C, a reconciliation engine block 322 may address any discrepancies in the UI. The reconciliation engine block 322 may identify coded language of the UI code, e.g., C/C++, Java, Python, VB.net/C#, HTML5, or other types of code. The reconciliation engine block 322 may also analyze and reconcile anomalies in the UI elements. Accordingly, the reconciliation engine block 322 may supply fixes based on known coding for similar UI functions. The fixes may be supplied to a universal programming adapter 324 to apply the fixes.

A discrepancies resolved block 326 may re-test to determine if the discrepancies have been resolved. The fix and the result of the fix, e.g., resolved or not resolved, may be provided to a sample code database 328 which may be saved in a cloud based repository 330. The sample code database 328 may store different code segments for each UX/UI element. Sample code segments may be used to adapt or reconcile problems at the UI/UX layer. Cloud based repositories may include Stanford.edu, GitHub, Azure, or other cloud based services.

Figure 4:
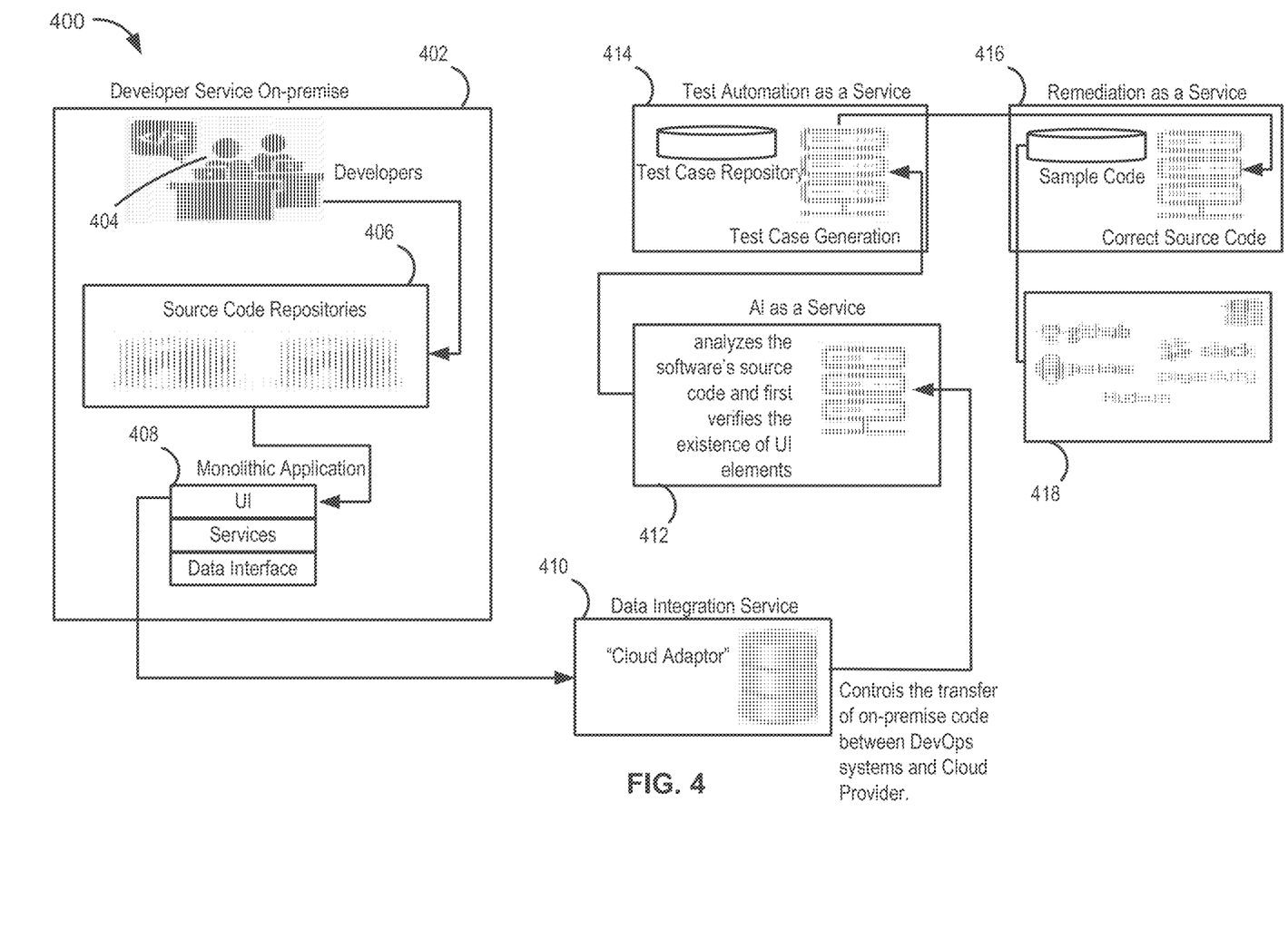
FIG. 4 is a diagram illustrating an example UI testing and reconciliation system.

FIG. 4 is a diagram illustrating an example UI testing and reconciliation system 400. In the illustrated example of FIG. 4, source code may be developed 402, e.g., by developers 404 in a location (or locations), e.g., a developer service on-premise. The source code may be stored in source code repository 406. The source code may be the code used to generate a UI. As discussed above, the code used to generate the UI may be written in C/C++, Java, Python, VB.net/C#, HTML, or other code language. In an example, the source code may be used to generate radio buttons, drop down lists, forms, logos, banners, or other items in the UI.

The source code may be part of a monolithic application 408. A monolithic application may be a single-tiered software application in which the user interface and data access code are combined into a single program from a single platform. A monolithic application may be self-contained, and independent from other computing applications. The monolithic application may include a UI, services, and a data interface. One or more of the UI, the services, and the data interface may be developed by the developers 404.

The UI from the monolithic application 408 may be sent to a data integration service 410 that may include a "cloud adapter." The cloud adapter in the data integration service 410 may control the transfer of on-premises code between a development operations system and a cloud provider. For example, a cloud adapter in the data integration service 410 may control the transfer of on-premises code to an AI service 412. The AI service 412 may analyze the UI source code and verify the existence of any UI elements in the code.

Verified UI code from the AI service 412 may be passed to a test automation as a service 414. The test automation as a service 414 may include a test case repository and test case generation. The test cased repository may be a database of test cases such as the database 106 of FIG. 1. The test case generation may include one or more computing devices that may generate various test cases to test UIs using the systems and methods described herein. The test case generation may determine when UI source code has been generated correctly. UI source code generated incorrectly may be sent to a remediation service 416 that may correct or attempt to correct the UI source code generated incorrectly. For example, the remediation service 416 may correct or attempt to correct the UI source code generated incorrectly based on sample code in a local database that may be transferred from a cloud based service 418 such as Github, Jenkins, Hudson, Slack, PagerDuty, or other cloud based service that may store sample code.

Figure 5:
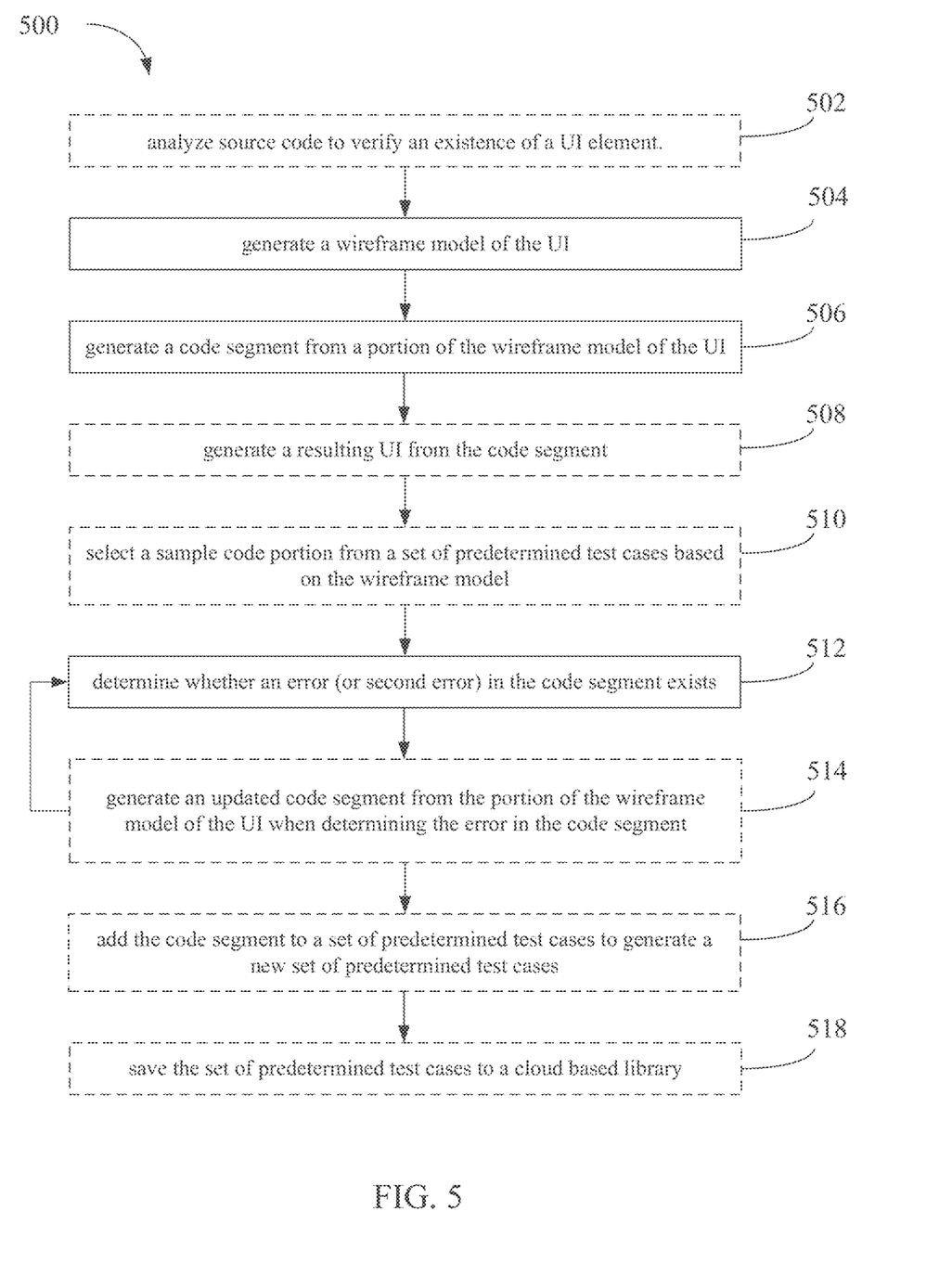
FIG. 5 is a diagram illustrating an example method.

FIG. 5 is a diagram illustrating an example method 500. The method 500 may be a method of UI testing. The method 500 may include analyzing source code to verify an existence of a UI element (502). The method 500 may also include generating a wireframe model of the UI (504). The method also includes generating a code segment from a portion of the wireframe model of the UI (506). Additionally, the method 500 may include generating a resulting UI from the code segment (508).

The method 500 may also include selecting a sample code portion from a set of predetermined test cases based on the wireframe model (510). The method 500 also includes determining whether an error in the code segment exists based on a comparison of an aspect of the wireframe model to an aspect of the code segment (512). The method 500 may include determining whether a second error in the code segment exists based on a second comparison of the aspect of the wireframe model to the aspect of the updated code segment. Additionally, the method 500 may include generating an updated code segment from the portion of the wireframe model of the UI when determining the error in the code segment (514). The method 500 may also include adding the code segment to a set of predetermined test cases to generate a new set of predetermined test cases (516).

Additionally, the method 500 may include saving the set of predetermined test cases to a cloud based library (518).

As discussed above, in some examples, the comparison of the aspect of the wireframe model to the aspect of the code segment includes comparing a resulting UI to a wireframe model. In other examples, the comparison of the aspect of the wireframe model to the aspect of the code segment includes comparing the sample code portion to the code segment. Accordingly, for examples where the comparison of the aspect of the wireframe model to the aspect of the code segment includes comparing a resulting UI to a wireframe model, the method of FIG. 5 includes generating a wireframe model of the UI (504). The method also includes generating a code segment from a portion of the wireframe model of the UI (506).

Additionally, the method 500 may include generating a resulting UI from the code segment (508). The method 500 also includes determining whether an error in the code segment exists based on a comparison of an aspect of the wireframe model, e.g., the wire frame model itself, to an aspect of the code segment (512), e.g., the resulting UI from the code segment generated in step 508.

For examples where the comparison of the aspect of the wireframe model to the aspect of the code segment includes comparing the sample code portion to the code segment, the method of FIG. 5 includes generating a wireframe model of the UI (504). The method also includes generating a code segment from a portion of the wireframe model of the UI (506). The method may also include selecting a sample code portion from a set of predetermined test cases based on the wireframe model (510). The method also includes determining whether an error in the code segment exists based on a comparison of an aspect of the wireframe model, e.g., the sample code portion selected from a set of predetermined test cases in step 510, to an aspect of the code segment (512), e.g., the code segment itself.

The method 500 may include determining whether a second error in the code segment exists based on a second comparison of the aspect of the wireframe model to the aspect of the updated code segment. Additionally, the method 500 may include generating an updated code segment from the portion of the wireframe model of the UI when determining the error in the code segment (514). The method 500 may also include adding the code segment to a set of predetermined test cases to generate a new set of predetermined test cases (516). Additionally, the method 500 may include saving the set of predetermined test cases to a cloud based library (518).

While the principles of this disclosure have been shown in various embodiments, many modifications of structure, arrangements, proportions, the elements, materials and components, used in practice, which may be particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of user interface (UI) testing comprising:
generating, by a computer based system, a wireframe model of the UI;
generating, by the computer based system, a code segment from a portion of the wireframe model of the UI;
determining, by the computer based system, whether an error in the code segment exists based on a comparison of an aspect of the wireframe model to an aspect of the code segment;
generating, by a designer utilizing the computer based system, an updated code segment from the portion of the wireframe model of the UI in response to determining an error in the code segment exists;
saving, in a UI modifier module, (a) the updated code segment, and (b) notes, comprising annotations and voice notes, of the designer regarding the updated code segment; and
utilizing a recorder, making the updated code segment and the designer's notes regarding the updated code segment immediately available to a development team for diagnosis.

2. The method of claim 1, further comprising generating, by the computer based system, a resulting UI from the code segment,
wherein the comparison of the aspect of the wireframe model to the aspect of the code segment comprises comparing, by the computer based system, the resulting UI to the wireframe model to determine the error in the code segment.

3. The method of claim 2, further comprising:
determining, by the computer based system, at least one of a window size, a window geometry, a UI element location, a UI element shape, a UI element size, a UI element function, a button, a button function, and a color, in response to comparing the resulting UI.

4. The method of claim 1, further comprising selecting, by the computer based system, a sample code portion from a set of predetermined test cases based on the wireframe model,
wherein the comparison of the aspect of the wireframe model to the aspect of the code segment comprises comparing, by the computer based system, the sample code portion to the code segment to determine the error in the code segment.

5. The method of claim 1, further comprising determining, by the computer based system, whether a second error in the code segment exists based on a second comparison of the aspect of the wireframe model to the aspect of the updated code segment.

6. The method of claim 1, further comprising adding, by the computer based system, the code segment to a set of predetermined test cases to generate a new set of predetermined test cases.

7. The method of claim 6, further comprising saving, by the computer based system, the set of predetermined test cases to a cloud based library.

8. The method of claim 1, further comprising analyzing, by the computer based system, source code to verify an existence of a UI element.

9. A user interface (UI) testing device comprising:
a processor; and
a tangible, non-transitory memory configured to communicate with the processor, the tangible, non-transitory memory having instructions stored thereon that, in response to execution by the processor, cause the processor to perform operations comprising:
generating, by the processor, a wireframe model of a UI;
generating, by the processor, a code segment from a portion of the wireframe model of the UI;
determining, by the processor, whether an error in the code segment exists based on a comparison of an aspect of the wireframe model to an aspect of the code segment;
generating, by a designer utilizing the processor, an updated code segment from the portion of the wireframe model of the UI in response to determining an error in the code segment exists;
saving, in a UI modifier module, (a) the updated code segment, and (b) notes, comprising annotations and voice notes, of the designer regarding the updated code segment; and
utilizing a recorder, making the updated code segment and the designer's notes regarding the updated code segment immediately available to a development team for diagnosis.

10. The UI testing device of claim 9, wherein the operations further comprise:
generating a resulting UI from the code segment,
wherein the comparison of the aspect of the wireframe model to the aspect of the code segment comprises comparing the resulting UI to the wireframe model to determine the error in the code segment.

11. The UI testing device of claim 9, wherein the operations further comprise:
selecting, by the processor, a sample code portion from a set of predetermined test cases based on the wireframe model,
wherein the comparison of the aspect of the wireframe model to the aspect of the code segment comprises comparing, by the processor, the sample code portion to the code segment to determine the error in the code segment.

12. The UI testing device of claim 9, wherein the operations further comprise:
determining, by the processor, at least one of a window size, a window geometry, a UI element location, a UI element shape, a UI element size, a UI element function, a button, a button function, and a color, in response to comparing the resulting UI.

13. The UI testing device of claim 9, wherein the operations further comprise:
determining, by the processor, whether a second error in the code segment exists based on a second comparison of the aspect of the wireframe model to the aspect of the updated code segment.

14. The UI testing device of claim 9, wherein the operations further comprise:
adding, by the processor, the code segment to a set of predetermined test cases to generate a new set of predetermined test cases.

15. The UI testing device of claim 14, wherein the operations further comprise:
saving, by the processor, the set of predetermined test cases to a cloud based library.

16. The UI testing device of claim 9, wherein the operations further comprise:
analyzing, by the processor, source code to verify an existence of a UI element.

17. An article of manufacture including a tangible, non-transitory memory configured to communicate with a processor, the tangible, non-transitory memory having instructions stored thereon that, in response to execution by the processor, cause the processor to perform operations comprising:
generating, by the processor, a wireframe model of the UI;
generating, by the processor, a code segment from a portion of the wireframe model of the UI;
determining, by the processor, whether an error in the code segment exists based on a comparison of an aspect of the wireframe model to an aspect of the code segment;
generating, by a designer utilizing the processor, an updated code segment from the portion of the wireframe model of the UI in response to determining an error in the code segment exists;
saving, in a UI modifier module, (a) the updated code segment, and (b) notes, comprising annotations and voice notes, of the designer regarding the updated code segment; and
utilizing a recorder, making the updated code segment and the designer's notes regarding the updated code segment immediately available to a development team for diagnosis.

18. The computer program product of claim 17, wherein the operations further comprise:
generating, by the processor, a resulting UI from the code segment,
wherein the comparison of the aspect of the wireframe model to the aspect of the code segment comprises comparing the resulting UI to the wireframe model to determine the error in the code segment.

19. The computer program product of claim 17, wherein the operations further comprise:
selecting, by the processor, a sample code portion from a set of predetermined test cases based on the wireframe model,
wherein the comparison of the aspect of the wireframe model to the aspect of the code segment comprises comparing the sample code portion to the code segment to determine the error in the code segment.

20. The computer program product of claim 17, wherein the operations further comprise:
determining, by the processor, at least one of a window size, a window geometry, a UI element location, a UI element shape, a UI element size, a UI element function, a button, a button function, and a color, in response to comparing the resulting UI.

* * * * *